Patented June 10, 1930

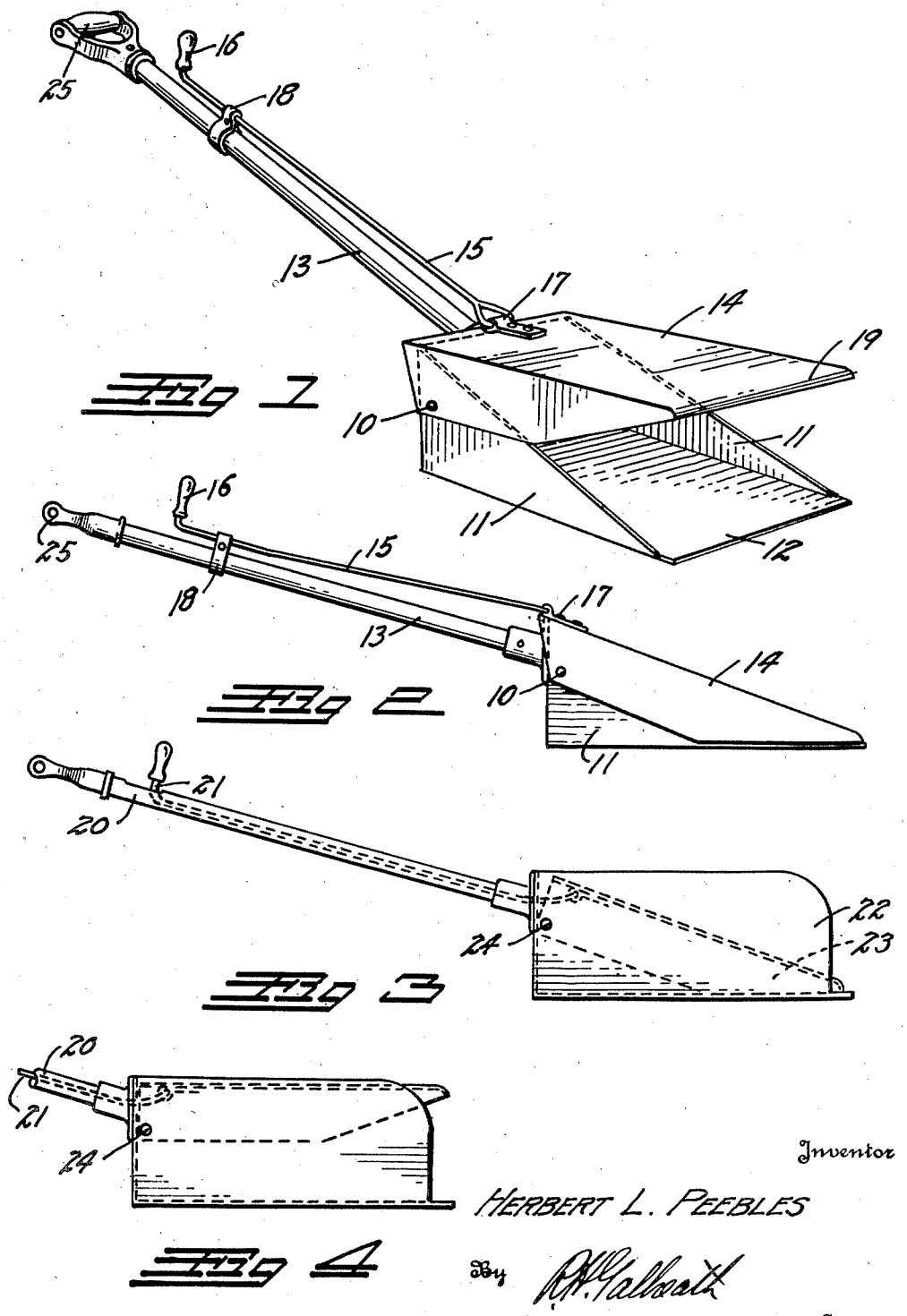
June 10, 1930. H. L. PEEBLES 1,762,347
DUSTLESS ASH SHOVEL
Filed Sept. 24, 1928

1,762,347

UNITED STATES PATENT OFFICE

HERBERT L. PEEBLES, OF DENVER, COLORADO

DUSTLESS ASH SHOVEL

Application filed September 24, 1928. Serial No. 307,843.

This invention relates to a shovel and is more particularly designed for handling ashes from household furnaces, stoves and the like. The principal object of the invention is the provision of a shovel which can be used for removing the ashes and placing them in a suitable receptacle without allowing dust to escape therefrom.

Another object of the invention is to provide a shovel which can be used for handling any material where it is essential that none of the material be spilled from the shovel.

Other objects and advantages reside in the detail construction of the invention, which is designated for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of my improved shovel in the open position.

Fig. 2 is a side elevation of the same in the closed position.

Fig. 3 is a side elevation of an alternate form of the invention in the closed position.

Fig. 4 illustrates the alternate form in the open position.

The invention comprises a shovel having inclined or triangular shaped sides 11 and a forwardly projecting bottom 12. The shovel is carried upon a handle 13 terminating in any suitable hand grip 25.

Hinged to the sides 11 at 10, is a lid 14, which can be opened and closed by means of an operating rod 15 which terminates in a hand hold 16 adjacent the grip 25. The operating rod 15 is hinged to the lid 14 as illustrated at 17 and slides through a guide 18 carried on the handle 13.

In use, the lid is brought to the open position and the shovel is forced into the ashpit of a furnace or the like. The operating rod 15 is then forced downwardly causing the lid 14 to close upon the shovel so as to prevent the escape of ashes. The shovel is then withdrawn and placed vertically in a suitable container. The lid 14 can then be opened by means of the operating rod to allow the ashes to escape while the combined lid and shovel form a hood to prevent the escape of dust from the container.

The forward edge of the lid 14 may be turned downwardly as indicated at 19 so that it will bite into the material upon the shovel as the lid closes. In the closed position the shovel is completely sealed at all points so that the escape of dust or material is impossible.

In the alternate form of the invention, illustrated in Figs. 3 and 4, relatively high sides 22 are formed upon the shovel bottom and a lid 23 somewhat similar to the lid 14, is pivoted at 24 to each of the sides so as to slide therebetween. This form of the invention keeps the sides completely closed at either the open or closed position of the lid. In this form the lid is operated by means of an operating rod 21 which passes thru the hollow interior of the handle 20. If desired the handle in the previous form of the invention could be made hollow and the operating rod 15 passed therethrough.

While a specific form of the improvement has been described and illustrated herein, it is desired to be understood that the same may be varied, within the scope of the appended claim, without departing from the spirit of the invention.

Having thus described the invention, what I claim and desire secured by Letters Patent is:—

A dustless ash shovel comprising: a shovel bottom; sides on said shovel bottom closed about one end thereof; a hollow handle extending from said closed end; a lid positioned between said sides; downwardly turned edges on said lid; pivots in said downwardly turned edges pivotally securing them to said sides; an operating rod extending from a point on said lid above said pivots through said end and through said hollow handle; and an operating extremity formed on said operating rod, said extremity extending through a slot in said hollow handle.

In testimony whereof, I affix my signature.

HERBERT L. PEEBLES.